(12) United States Patent
Kojima (10) Patent No.: US 10,471,830 B2
(45) Date of Patent: Nov. 12, 2019

(54) GROUND FAULT PROTECTION FOR CHARGING SYSTEM AND ELECTRICALLY POWERED VEHICLE

(71) Applicant: Toyota Jidosha Kabushiki Kaisha, Toyota-shi, Aichi-ken (JP)

(72) Inventor: Koichi Kojima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 58 days.

(21) Appl. No.: 15/686,841

(22) Filed: Aug. 25, 2017

(65) Prior Publication Data

US 2018/0056789 A1 Mar. 1, 2018

(30) Foreign Application Priority Data

Aug. 30, 2016 (JP) .................................. 2016-167615

(51) Int. Cl.
*B60L 3/00* (2019.01)
*B60K 6/28* (2007.10)
(Continued)

(52) U.S. Cl.
CPC .............. *B60L 3/0069* (2013.01); *B60K 6/28* (2013.01); *B60L 53/14* (2019.02); *B60L 53/305* (2019.02); *B60L 53/60* (2019.02); *B60L 3/00* (2013.01); *B60L 2250/10* (2013.01); *B60L 2250/16* (2013.01); *B60Y 2200/92* (2013.01); *B60Y 2300/91* (2013.01); *H02P 27/06* (2013.01); *Y02T 10/7005* (2013.01); *Y02T 10/7088* (2013.01); *Y02T 90/121* (2013.01);
(Continued)

(58) Field of Classification Search
CPC ..... Y02T 90/14; Y02T 90/128; Y02T 90/163; Y02T 10/7005; Y02T 10/7088; B60L 3/0069; B60L 11/1838; B60L 11/1816; B60L 2250/16; B60L 2250/10; B60L 2230/16; B60K 6/28; B60Y 2200/92; B60Y 2300/91; Y10S 903/907; H02P 27/06; H02H 3/335; H02H 3/33; H02H 1/0015; H02H 3/338; H01H 83/04
USPC ............................................. 320/109; 361/42
See application file for complete search history.

(56) References Cited

U.S. PATENT DOCUMENTS 5,049,802 A * 9/1991 Mintus .................. B60L 3/0069
320/107
2010/0207635 A1* 8/2010 Plagens ................. B60L 3/0023
324/509

(Continued)

FOREIGN PATENT DOCUMENTS

JP 2009-261133 A 11/2009
JP 2010-239845 A 10/2010

*Primary Examiner* — Richard Isla
*Assistant Examiner* — Mohammed J Sharief
(74) *Attorney, Agent, or Firm* — Dinsmore & Shohl LLP (57) ABSTRACT

An ECU performs a program including: during charging, when abnormality information has been received, bringing each of an SMR and a CHR into an OFF state; when a charging connector is disconnected and when a vehicle is in a Ready-On state, starting a ground fault detection process; when it is determined that a ground fault has occurred on the vehicle side, performing a display process (1); and in the state where it is not determined that a ground fault has occurred on the vehicle side, when a prescribed detection time period has elapsed, performing a display process (2).

6 Claims, 7 Drawing Sheets

(51) Int. Cl.
*B60L 53/14* (2019.01)
*B60L 53/60* (2019.01)
*B60L 53/30* (2019.01)
H02P 27/06 (2006.01)

(52) U.S. Cl.
CPC .............. *Y02T 90/128* (2013.01); *Y02T 90/14* (2013.01); *Y02T 90/163* (2013.01); *Y10S 903/907* (2013.01)

(56) References Cited

U.S. PATENT DOCUMENTS

| | | | | |
|---|---|---|---|---|
| 2010/0301809 | A1* | 12/2010 | Bhade | H01M 10/4207 320/148 |
| 2012/0043967 | A1* | 2/2012 | Miura | B60L 3/0069 324/426 |
| 2014/0347769 | A1* | 11/2014 | Kanda | H01M 10/44 361/42 |
| 2015/0048791 | A1* | 2/2015 | Veiga | B60L 11/1816 320/109 |
| 2016/0052411 | A1* | 2/2016 | Tanabe | B60L 3/0023 320/109 |

* cited by examiner

GROUND FAULT PROTECTION FOR CHARGING SYSTEM AND ELECTRICALLY POWERED VEHICLE

CROSS-REFERENCE TO RELATED APPLICATIONS

This nonprovisional application claims priority to Japanese Patent Application No. 2016-167615 filed on Aug. 30, 2016, with the Japan Patent Office, the entire contents of which are hereby incorporated by reference.

BACKGROUND

Field

The present disclosure relates to control of a charging system and an electrically powered vehicle, which is executed when a ground fault occurs during charging of a power storage device mounted in the electrically powered vehicle using a charging facility external to the electrically powered vehicle.

Description of the Background Art

There is a known technique for charging a power storage device mounted in an electrically powered vehicle using a charging facility external to the vehicle. As an example of such a technique, Japanese Patent Laying-Open No. 2010-239845 discloses a technique for cutting off power supply to a battery mounted in a vehicle by using a leakage interrupter when a ground fault is detected by a ground fault detector provided in a charging facility external to the vehicle during charging using the charging facility.

SUMMARY

When a ground fault is detected by the ground fault detector provided in the charging facility, however, it cannot be distinguished whether a ground fault occurs in the charging facility or the electrically powered vehicle. This is because an electrical connection is established between the charging facility and the power storage device mounted in the electrically powered vehicle.

The present disclosure has been made to solve the above-described problems. An object of the present disclosure is to provide a charging system and an electrically powered vehicle, by which it is distinguished whether the vehicle can be used or not, when a ground fault occurs during charging of a power storage device mounted in the vehicle using a charging facility external to the vehicle.

A charging system according to an aspect of the present disclosure includes: an electrically powered vehicle provided with a power storage device configured to supply electric power to a driving motor; and a charging facility provided external to the electrically powered vehicle and configured to charge the power storage device. The charging facility includes a power supply, a charging connector that is connectable to the electrically powered vehicle, a charger configured to charge the power storage device using electric power of the power supply when the charging connector is connected to the electrically powered vehicle, and a first detector for detecting, during charging of the power storage device, a ground fault in a charging path extending from the power supply to the power storage device. The charging facility is configured to, when the ground fault is detected by the first detector during charging, stop charging of the power storage device and transmit abnormality information indicating occurrence of the ground fault to the electrically powered vehicle. The charging path includes (i) a first path for connecting the power supply and the charging connector, and (ii) a second path for connecting the first path and the power storage device when the charging connector is connected to the electrically powered vehicle. The electrically powered vehicle includes a second detector for detecting a ground fault in the second path, and a second controller configured to, when the abnormality information is received from the charging facility, perform ground fault detection using the second detector after the charging connector is disconnected.

In this way, when the abnormality information is received from the charging facility, ground fault detection is performed using the second detector after the charging connector is disconnected. Accordingly, it can be distinguished whether the ground fault occurring during charging using the charging facility occurs in the electrically powered vehicle or not.

In an embodiment, the electrically powered vehicle further includes a notifier for notifying a user of information. The notifier is configured to, when the abnormality information is received, notify a user of information that varies depending on whether or not the ground fault in the second path is detected.

In this way, when the abnormality information is received, the user is notified about information that varies depending on whether a ground fault has been detected or not in the electrically powered vehicle. Accordingly, the user can be notified about appropriate information depending on whether the ground fault occurs or not in the vehicle.

An electrically powered vehicle according to another aspect of the present disclosure includes: a driving motor for driving the electrically powered vehicle; a power storage device configured to supply electric power to the driving motor; a detector for detecting a ground fault in the electrically powered vehicle; and a controller configured to perform ground fault detection using the detector. When abnormality information indicating a ground fault is received from a charging facility during charging using the charging facility, the ground fault detection is performed after the electrically powered vehicle and the charging facility are disconnected from each other, the charging facility being provided external to the electrically powered vehicle.

In this way, when the abnormality information is received from the charging facility, ground fault detection is performed using the detector after the electrically powered vehicle and the charging facility are disconnected from each other. Accordingly, it can be distinguished whether the ground fault occurring during charging using the charging facility occurs in the electrically powered vehicle or not.

In an embodiment, the electrically powered vehicle further includes a notifier for notifying a user of information. The notifier is configured to, when the abnormality information is received, notify a user of information that varies depending on whether or not the ground fault in the electrically powered vehicle is detected.

In this way, when abnormality information is received, the user is notified about information that varies depending on whether the ground fault has been detected or not in the electrically powered vehicle. Accordingly, the user can be notified about appropriate information depending on whether the ground fault occurs or not in the vehicle.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The embodiments of the present disclosure will be hereinafter described in detail with reference to the accompanying drawings, in which the same or corresponding components are designated by the same reference characters, and description thereof will not be repeated.

In embodiments described below, a vehicle will be described by way of example as a hybrid vehicle provided with a motor generator and an engine as a driving source, but the vehicle may be an electrically powered vehicle including at least a motor generator as a driving source.

Figure 1:
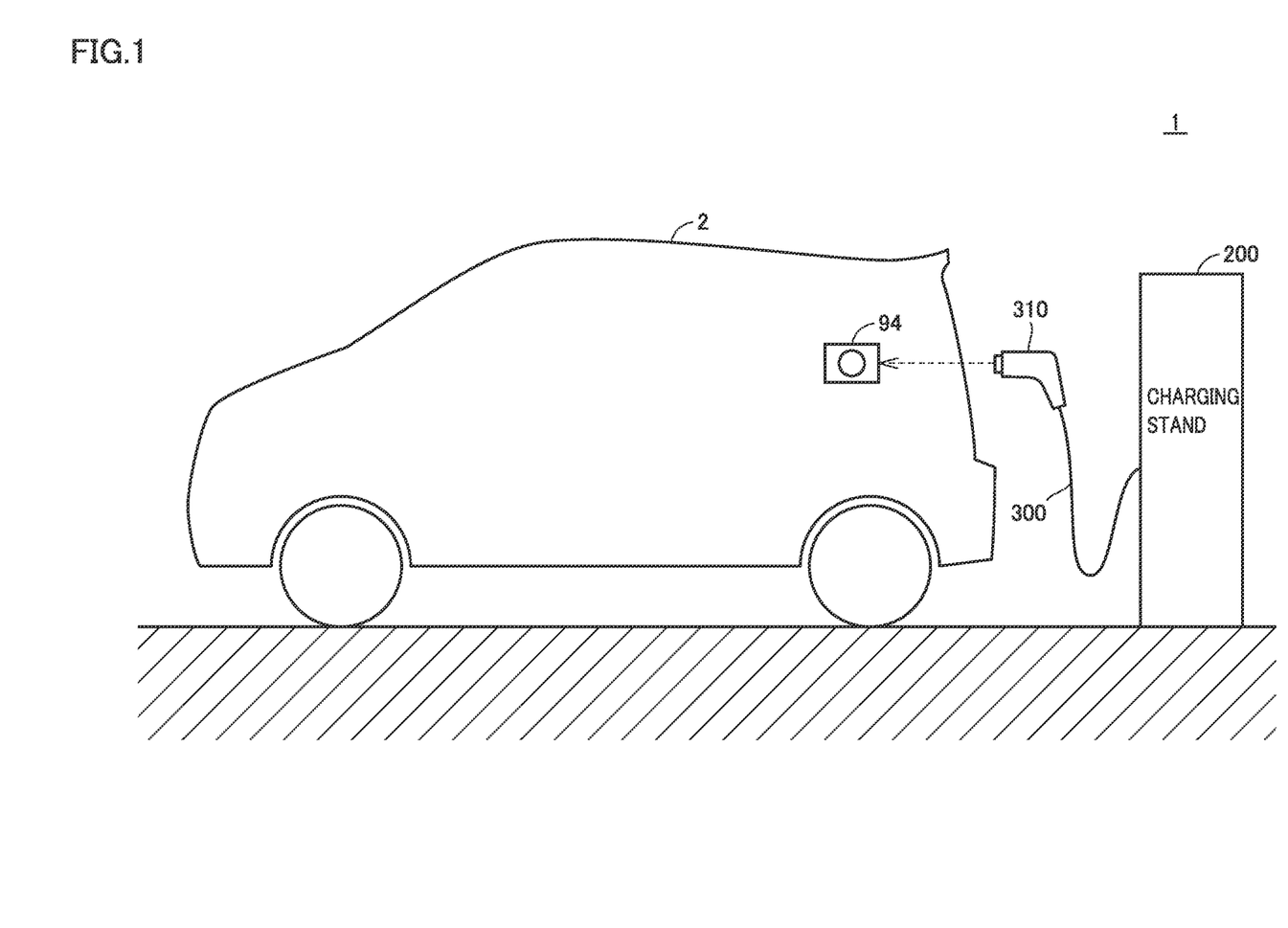
FIG. 1 is a diagram schematically showing an entire configuration of a charging system according to the present embodiment.

FIG. 1 is a diagram schematically showing an entire configuration of a charging system according to the present embodiment. As shown in FIG. 1, a charging system 1 in the present embodiment includes a vehicle 2, a charging stand 200, a charging cable 300, and a charging connector 310.

Charging stand 200 corresponds to a charging facility provided external to vehicle 2. Charging cable 300 has one end connected to charging stand 200 and the other end provided with a charging connector 310. The end of charging connector 310 is shaped such that it can be fitted in an inlet 94 provided in vehicle 2. When charging connector 310 is connected to inlet 94, a battery mounted in vehicle 2 (see FIG. 2) can be charged using charging stand 200. In the following description, such charging using charging stand 200 will be referred to as external charging.

When charging is performed using charging stand 200 in the state where charging connector 310 is connected to inlet 94 of vehicle 2, charging stand 200 converts alternating-current (AC) power supplied from a power supply (see FIG. 2) into direct-current (DC) power, and supplies the converted DC power to vehicle 2 through charging cable 300 and charging connector 310. In this way, the battery mounted in vehicle 2 (see FIG. 2) is charged with the DC power supplied to vehicle 2.

Figure 2:
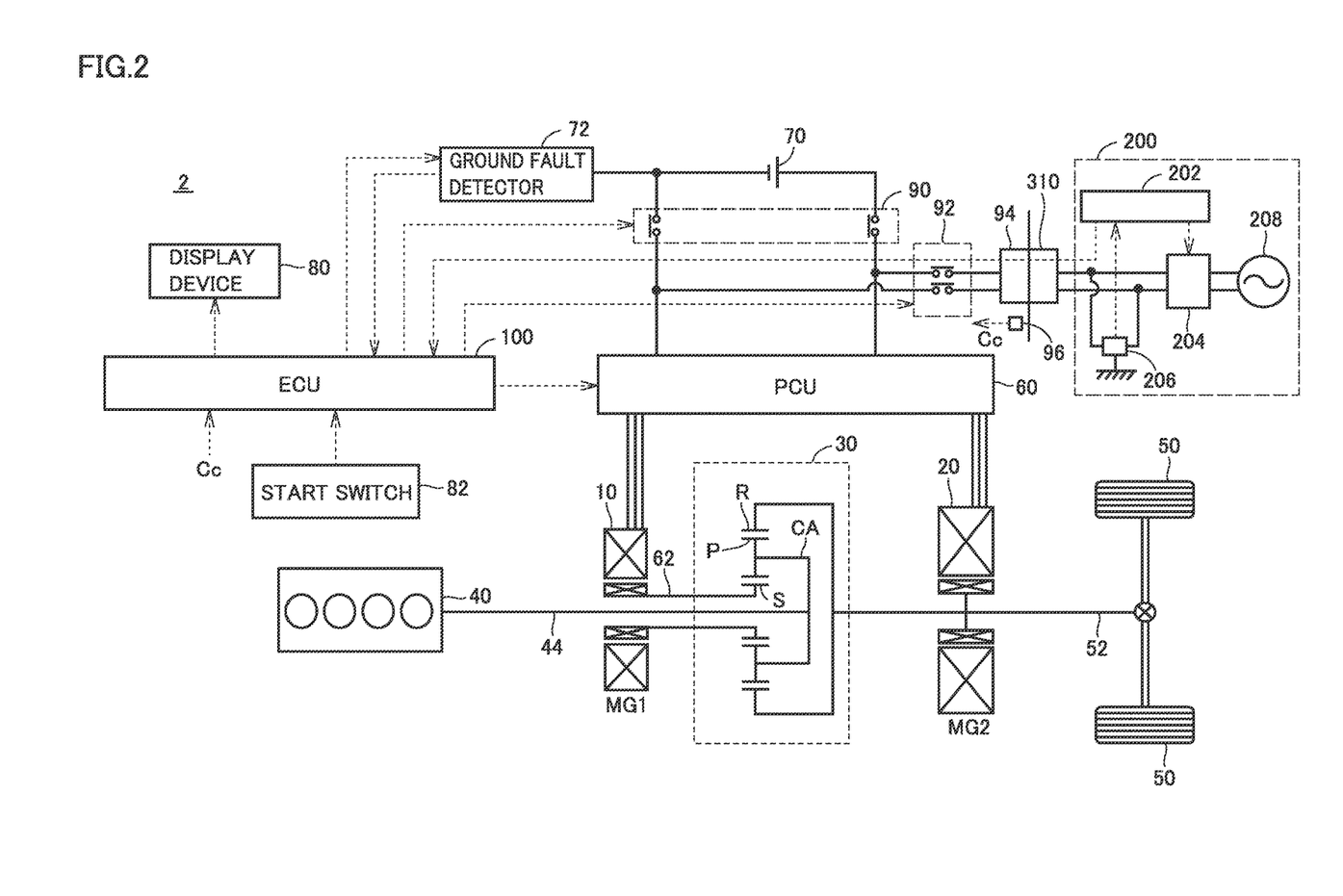
FIG. 2 is a block diagram showing a detailed configuration of the charging system according to the present embodiment.

FIG. 2 is a block diagram showing a detailed configuration of charging system 1 according to the present embodiment. As shown in FIG. 2, vehicle 2 includes a first motor generator (hereinafter referred to as a first MG) 10, a second motor generator (hereinafter referred to as a second MG) 20, a power split device 30, an engine 40, driving wheels 50, a power control unit (PCU) 60, a battery 70, a ground fault detector 72, a display device 80, a start switch 82, a system main relay (hereinafter referred to as an SMR) 90, a charging relay (hereinafter referred to as a CHR) 92, an inlet 94, and an electronic control unit (ECU) 100.

Engine 40 is an internal combustion engine such as a gasoline engine and a diesel engine, and controlled based on a control signal from ECU 100. Based on the state of engine 40 (for example, the engine rotation speed and the like), ECU 100 controls the fuel amount supplied to a cylinder, the fuel injection timing, the ignition timing of the fuel-air mixture inside the cylinder, and the like.

First MG 10 and second MG 20 each serve as a three-phase AC rotating electric machine, for example. First MG 10 and second MG 20 are driven by PCU 60.

First MG 10 has a function as a generator (power generator) generating electric power using the motive power of engine 40 split by power split device 30. The electric power generated by first MG 10 is supplied to battery 70 through PCU 60. Furthermore, first MG 10 receives the electric power from battery 70 to rotate an output shaft 44 of engine 40. Thereby, first MG 10 has a function as a starter for starting engine 40.

Second MG 20 has a function as a driving motor supplying driving force to driving wheels 50 using at least one of the electric power stored in battery 70 and the electric power generated by first MG 10. Furthermore, second MG 20 has a function as a generator for performing regenerative power generation during braking. The electric power generated by second MG 20 is supplied to battery 70 through PCU 60.

Power split device 30 is configured to be capable of splitting the motive power generated by engine 40 into a path leading to driving wheels 50 through an output shaft 52 and a path leading to first MG 10. Power split device 30 is, for example, a planetary gear mechanism including a sun gear S, a carrier CA, a ring gear R, and a pinion gear P. Sun gear S is coupled to the rotor of first MG 10. Ring gear R is coupled to the rotor of second MG 20. Pinion gear P engages with sun gear S and ring gear R. Carrier CA is configured to hold pinion gear P in a rotatable and revolvable manner and coupled to output shaft 44 of engine 40. In this way, engine 40, first MG 10, and second MG 20 are mechanically connected via power split device 30.

Vehicle 2 having such a configuration runs with the driving force output from at least one of engine 40 and second MG 20.

PCU 60 converts the DC power supplied from battery 70 into AC power for driving first MG 10 and second MG 20. Also, PCU 60 converts the AC power generated by first MG 10 and second MG 20 into DC power for charging battery 70. For example, PCU 60 is configured to include an inverter (not shown) for DC/AC power conversion and a converter (not shown) for performing DC voltage conversion between the DC link side of the inverter and battery 70.

Battery 70 is a rechargeable DC power supply. As battery 70, secondary batteries such as a nickel-metal hydride battery and a lithium ion battery are used, for example. As described above, battery 70 is charged with electric power generated by first MG 10 and/or second MG 20, and also charged with electric power supplied from charging stand 200. Battery 70 is not limited to a secondary battery but may be a rechargeable power storage device capable of generating a DC voltage, which for example may be a capacitor and the like.

An SMR 90 is provided on the first power line between PCU 60 and battery 70. In response to a control signal from ECU 100, SMR 90 switches the state of the first power line into a conductive state (ON state) or an interrupted state (OFF state).

A CHR 92 is provided on the second power line that is branched from a portion of the first power line between SMR 90 and PCU 60 and connected to inlet 94. In response to a control signal from ECU 100, CHR 92 switches the state of the second power line into a conductive state (ON state) or an interrupted state (OFF state). When battery 70 is charged using the above-described charging stand 200, for example, CHR 92 is switched into an ON state.

Inlet 94 is provided with a connection detector 96. Connection detector 96 detects whether charging connector 310 has been connected to inlet 94 or not. When connection detector 96 detects that charging connector 310 has been connected, it transmits, to ECU 100, a signal Cc showing that charging connector 310 has been connected. Connection detector 96 is implemented, for example, by a contact sensor, a configuration having a circuit resistance that is mechanically changed by connection of charging connector 310 to inlet 94, and the like.

ECU 100 is configured to include a central processing unit (CPU), a memory as a storage device, an input/output buffer, and the like (which are not shown). Based on the signals from each sensor and device, and the map and the program stored in the memory, ECU 100 controls each of the devices to bring vehicle 2 into a desired driving state. The above-described control is not limited to the process by software, but can also be carried out by dedicated hardware (an electronic circuit).

ECU 100 serves as a controller configured to control the entire hybrid system, that is, the charged/discharged state of battery 70, and the operation states of engine 40, first MG 10 and second MG 20, such that vehicle 2 can be operated most efficiently.

Display device 80 is configured, for example, by a liquid crystal display, an organic electro luminescence (EL) display, and the like. Display device 80 may be provided, for example, with an input device such as a touch panel. Display device 80 is disposed at a position where this display device can be visible to a driver, for example, at a position inside the combination meter arranged on the instrument panel. In response to a control signal from ECU 100, display device 80 shows various pieces of information about vehicle 2 (for example, image information, text information and the like for calling attention to a user).

Start switch 82 serves as an input device for the user to perform a Ready-On operation or a Ready-Off operation. When start switch 82 is operated, a signal showing that start switch 82 has been operated is transmitted to ECU 100.

The Ready-On operation is performed for starting the vehicle system (devices for causing vehicle 2 to travel) so as to bring vehicle 2 into a Ready-On state (the state where the vehicle can travel). The Ready-Off operation is performed for stopping the vehicle system so as to bring vehicle 2 into a Ready-Off state (the state where the vehicle cannot travel).

In the Ready-On state, ECU 100 having functions that are partially in an idle state is started while SMR 90 is turned on, so that power can be supplied to second MG 20. At this time, ECU 100 drives second MG 20 such that the driving force for vehicle 2 is generated in accordance with the driver's accelerator pedal operation.

In the Ready-Off state, the functions of ECU 100 are partially brought into an idle state while SMR 90 is turned off, so that power cannot be supplied to second MG 20. Accordingly, in the Ready-Off state, even if the driver operates the accelerator pedal, no driving force is generated for vehicle 2.

When ECU 100 receives a signal showing that start switch 82 has been operated in the Ready-Off state, ECU 100 brings vehicle 2 into a Ready-On state. When ECU 100 receives a signal showing that start switch 82 has been operated in the Ready-Off state, ECU 100 brings vehicle 2 into a Ready-Off state.

Ground fault detector 72 detects whether a ground fault occurs or not in the charging path on the vehicle side that connects inlet 94 and battery 70. In response to a control signal from ECU 100, ground fault detector 72 performs ground fault detection. Ground fault detector 72 transmits a signal showing the detection result to ECU 100.

Figure 3:
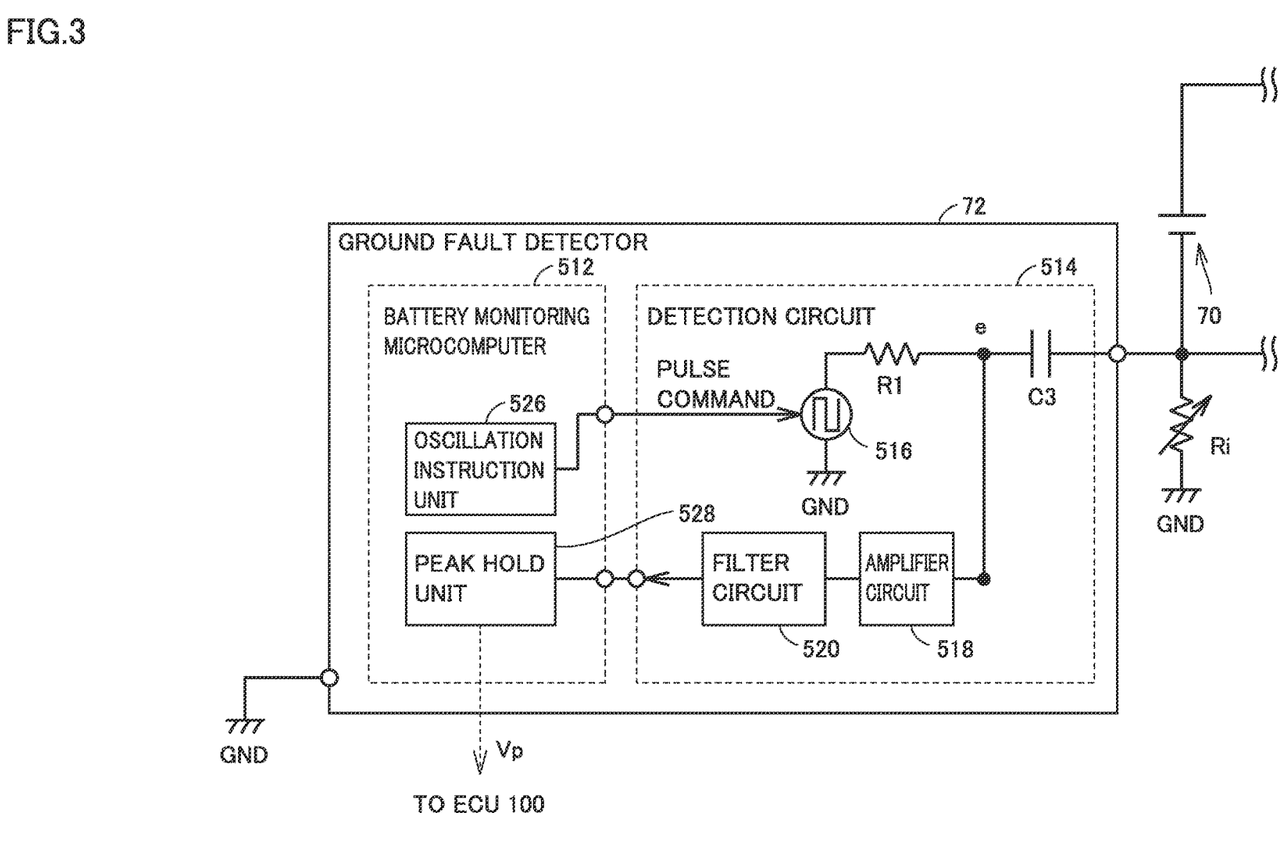
FIG. 3 is a diagram showing an example of a configuration of a ground fault detector mounted in a vehicle in the present embodiment.

FIG. 3 is a diagram showing an example of a configuration of ground fault detector 72 mounted in vehicle 2 in the present embodiment. As shown in FIG. 3, ground fault detector 72 includes a battery monitoring microcomputer 512 and a detection circuit 514. FIG. 3 does not show components shown in FIG. 2 other than battery 70 and ground fault detector 72. FIG. 3 also shows an insulation resistance Ri that is located between a high voltage system (PCU 60, battery 70 and the like) of vehicle 2 and the body (GND).

Detection circuit 514 includes an oscillation circuit 516 serving as a signal generation unit, an amplifier circuit 518, a filter circuit 520, a detection resistance R1, and a capacitor C3 serving as a coupling capacitor.

Oscillation circuit 516 is connected to one end of detection resistance R1. Based on the pulse command from battery monitoring microcomputer 512, oscillation circuit 516 outputs a pulse signal that changes at a predetermined frequency to a connection node with one end of detection resistance R1. Detection resistance R1 has the other end connected to one end of capacitor C3. Specifically, detection resistance R1 is connected between oscillation circuit 516 and capacitor C3. Capacitor C3 has the other end connected to the negative electrode line of battery 70.

Amplifier circuit 518 is connected to a connection node e between the other end of detection resistance R1 and one end of capacitor C3. Amplifier circuit 518 amplifies the pulse signal from connection node e, and outputs the amplified pulse signal to filter circuit 520. Filter circuit 520 is for example a band-pass filter, and extracts a pulse signal in a prescribed frequency band from the pulse signal input from amplifier circuit 518, and then outputs the extracted pulse signal to battery monitoring microcomputer 512. The prescribed frequency band is set, for example, in accordance with the frequency of the pulse signal output from oscillation circuit 516.

Battery monitoring microcomputer 512 controls oscillation circuit 516. Battery monitoring microcomputer 512 also detects a voltage of the signal output from filter circuit 520. Then, based on the detected voltage, battery monitoring microcomputer 512 detects a decrease in insulation resistance Ri. Battery monitoring microcomputer 512 includes an oscillation instruction unit 526 and a peak hold unit 528.

Oscillation instruction unit 526 gives an instruction to oscillation circuit 516 to generate a pulse signal. Peak hold unit 528 detects a peak voltage (the maximum voltage) in a prescribed sampling period of the pulse signal output from filter circuit 520, and transmits the detected peak voltage to ECU 100 as a peak value Vp. The prescribed sampling period is not particularly limited as long as it is a period in which at least the voltage corresponding to the peak of the pulse signal can be detected.

ECU 100 determines based on peak value Vp received from battery monitoring microcomputer 512 whether a ground fault is caused or not by a decrease in insulation resistance Ri.

In the normal state where a ground fault does not occur, the resulting condition is that insulation resistance Ri>>detection resistance R1. Accordingly, the peak voltage detected in peak hold unit 528 becomes equal to a peak voltage of the voltage of the signal output from oscillation circuit 516. On the other hand, when insulation resistance Ri decreases, voltage division occurs, and the peak voltage detected in peak hold unit 528 decreases as compared with that in the normal state. Accordingly, when peak value Vp is smaller than a threshold value Vp(0), ECU 100 determines that a ground fault occurs. Threshold value Vp(0) is for example a predetermined value, and also smaller than the peak voltage observed in the state where at least a ground fault does not occur.

According to the description of the present embodiment, ECU 100 determines whether a ground fault has occurred or not. However, for example, battery monitoring microcomputer 512 may determine whether a ground fault has occurred or not.

Referring back to FIG. 2, charging stand 200 includes a controller 202, a power converter 204, a ground fault detection circuit 206, and a power supply 208.

Power supply 208 serves as an AC power supply of 100V, 200V or the like. In response to the control signal from controller 202, power converter 204 converts the AC power supplied from power supply 208 into DC power.

When battery 70 is being externally charged using charging stand 200, ground fault detection circuit 206 detects whether a ground fault occurs or not. Ground fault detection circuit 206, for example, includes: a series circuit in which two power lines are connected to each other with two resistors having the same resistance value; and a ground line through which a connection node (a neutral point) connecting two resistors is grounded. Based on whether a ground fault current flows through the ground line or not, ground fault detection circuit 206 detects whether a ground fault has occurred or not. When it is detected that a ground fault has occurred (that is, a ground fault current flows through the ground line), ground fault detection circuit 206 transmits, to controller 202, a signal showing that the ground fault has been detected.

Controller 202 is configured to include a CPU, a memory as a storage device, an input/output buffer, and the like (which are not shown). Based on the signals from each sensor and device, and the map and the program stored in the memory, controller 202 controls each of the devices to bring charging stand 200 into a desired operating state. The above-described control is not limited to the process by software, but can also be carried out by dedicated hardware (an electronic circuit).

In addition, charging cable 300 includes a communication line that is not shown. Controller 202 of charging stand 200 and ECU 100 of vehicle 2 transmits and receives information to and from each other through communication with each other via the communication line when charging connector 310 is connected to inlet 94. Controller 202 and ECU 100 establish communication, for example, according to a prescribed communication scheme such as Controller Area Network (CAN) communication or Power Line Communication (PLC).

Furthermore, charging stand 200 is provided with a charge starting switch (not shown), for example. When the user operates the charge starting switch, controller 202 starts a charging sequence.

The following description is an example of the charging sequence performed in charging system 1 according to the present embodiment.

When ECU 100 of vehicle 2 detects that charging connector 310 has been connected to inlet 94, ECU 100 brings each of SMR 90 and CHR 92 into an ON state, thereby allowing battery 70 to be chargeable.

When the user operates the charge starting switch, controller 202 of charging stand 200 starts communication with ECU 100 and receives battery information such as the maximum voltage and the battery capacity of battery 70 from the ECU 100 side. Also, controller 202 of charging stand 200 transmits the charger information such as the maximum voltage and the maximum current of charging stand 200.

Based on the received information, each of ECU 100 and controller 202 determines whether charging can be conducted or not. When each of ECU 100 and controller 202 determines that charging can be conducted, controller 202 causes power converter 204 to operate to start charging.

When the state of charge (SOC) of battery 70 exceeds a threshold value, ECU 100 transmits a signal to controller 202 for requesting to stop charging. When controller 202 receives the signal, it stops the operation of power converter 204.

ECU 100 estimates the SOC of battery 70, for example, based on the current, the voltage, the battery temperature or the like of battery 70. ECU 100 may estimate the open circuit voltage (OCV), for example, based on the current, the voltage and the battery temperature, and may estimate the SOC of the battery based on the estimated OCV and a prescribed map. Alternatively, ECU 100 may estimate the SOC of battery 70, for example, by summing the charge current and the discharge current of battery 70.

In charging system 1 having the above-described configuration, when it is detected by ground fault detection circuit 206 during charging of battery 70 using charging stand 200 that a ground fault has occurred, controller 202 of charging stand 200 stops charging.

However, when ground fault detection circuit 206 of charging stand 200 detects a ground fault, it cannot be distinguished whether this ground fault has occurred in charging stand 200 or vehicle 2. This is because an electrical connection is established between charging stand 200 and battery 70. Consequently, it cannot be distinguished whether the electrically powered vehicle can be used or not.

Thus, in the present embodiment, when ground fault detection circuit 206 detects a ground fault during charging of battery 70 mounted in vehicle 2, controller 202 of charging stand 200 stops charging of battery 70, and also transmits, to vehicle 2, abnormality information indicating that a ground fault has been detected. When ECU 100 of vehicle 2 receives the abnormality information from charging stand 200, ECU 100 performs ground fault detection using ground fault detector 72 of vehicle 2 after charging connector 310 is disconnected.

In this way, ground fault detection using ground fault detector 72 can be performed in the state where vehicle 2 is electrically separated from charging stand 200. Accordingly, by distinguishing whether a ground fault has occurred or not in vehicle 2, it can be distinguished whether the ground fault occurring during charging using charging stand 200 has occurred in vehicle 2 or not.

Figure 4:
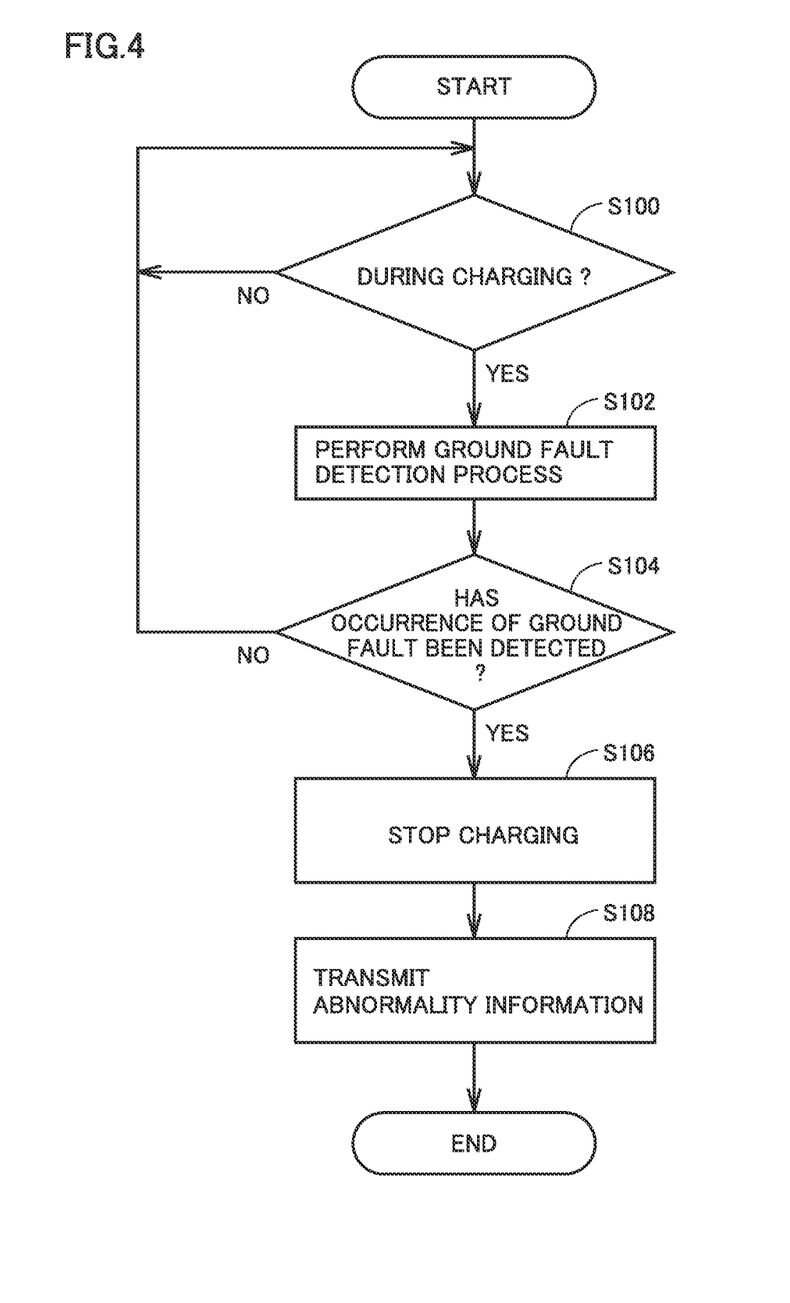
FIG. 4 is a flowchart illustrating a control process executed by a controller of a charging stand in the present embodiment.

The following is an explanation about the control process performed in controller 202 of charging stand 200 with reference to FIG. 4. FIG. 4 is a flowchart illustrating the control process executed by controller 202 of charging stand 200 in the present embodiment.

In step (hereinafter referred to as "S") 100, controller 202 determines whether charging is being conducted or not. For example, when charging connector 310 is connected to vehicle 2 and power converter 204 is being operated (that is, when the charging current is flowing), controller 202 determines that charging is being conducted. When it is determined that charging is being conducted (YES in S100), the process is advanced to S102.

In S102, controller 202 performs the ground fault detection process using ground fault detection circuit 206. Since the method for detecting a ground fault is as described above, the detailed description thereof will not be repeated.

In S104, controller 202 determines whether a ground fault has been detected or not. When controller 202 receives, from ground fault detection circuit 206, a signal showing that a ground fault has been detected, controller 202 determines that a ground fault has been detected. When it is determined that a ground fault has been detected (YES in S104), the process is advanced to S106.

In S106, controller 202 stops charging. Controller 202 stops the operation of power converter 204 to stop charging. In S108, controller 202 transmits, to ECU 100 of vehicle 2, the abnormality information indicating that charging has been stopped due to detection of a ground fault.

In the flowchart in FIG. 4, when charging is not being conducted (NO in S100) or when a ground fault has not been detected (NO in S104), the process is returned to S100. For example, when it is determined that charging of battery 70 has normally been completed in the main routine (not shown), controller 202 ends the control process shown in the flowchart of FIG. 4 by the interrupting process.

Figure 5:
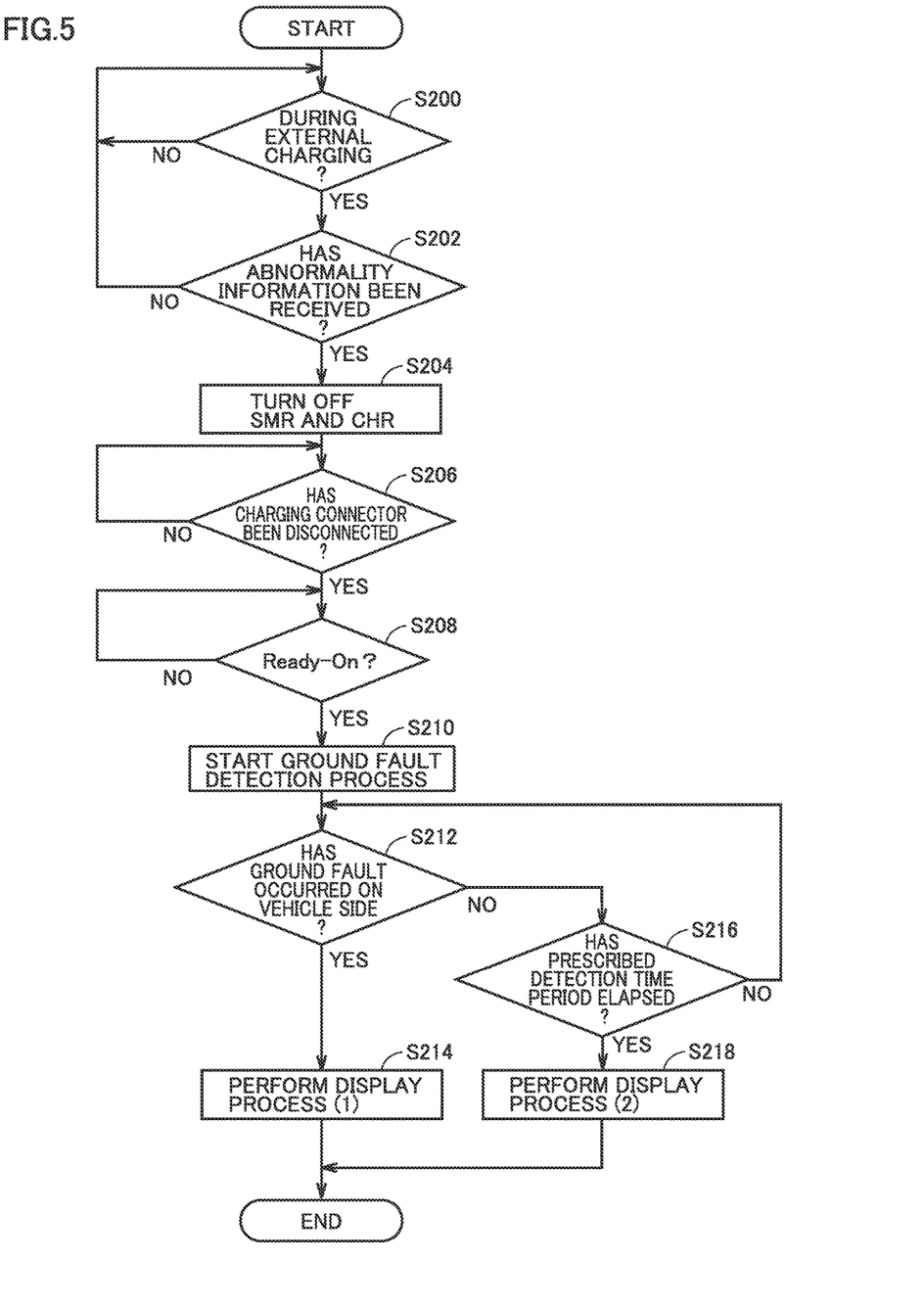
FIG. 5 is a flowchart illustrating a control process executed by an ECU of the vehicle in the present embodiment.

Then, the control process performed by ECU 100 of vehicle 2 will be hereinafter described with reference to FIG. 5. FIG. 5 is a flowchart illustrating the control process executed by ECU 100 of vehicle 2 in the present embodiment.

In S200, ECU 100 determines whether external charging is being conducted or not. For example, when charging connector 310 is connected to vehicle 2, SMR 90 and CHR 92 each are in an ON state and the charging current is supplied to battery 70, then, ECU 100 determines that external charging is being conducted. When it is determined that external charging is being conducted (YES in S200), the process is advanced to S202.

In S202, ECU 100 determines whether abnormality information has been received or not from charging stand 200. When it is determined that the abnormality information has been received (YES in S202), the process is advanced to S204. In S204, ECU 100 brings each of SMR 90 and CHR 92 into an OFF state. At this time, vehicle 2 is brought into a Ready-Off state.

In S206, ECU 100 determines whether charging connector 310 has been disconnected or not. Based on the signal received from connection detector 96, ECU 100 determines whether charging connector 310 has been disconnected or not. When it is determined that charging connector 310 has been disconnected (YES in S206), the process is advanced to S208.

In S208, ECU 100 determines whether vehicle 2 is in a Ready-On state or not. For example, when the operation to allow vehicle 2 to travel is performed (for example, the Ready-On operation is performed with start switch 82), ECU 100 determines that vehicle 2 is in a Ready-On state. When it is determined that vehicle 2 is in a Ready-On state (YES in S208), the process is advanced to S210.

In S210, ECU 100 starts the ground fault detection process using ground fault detector 72. Since the ground fault detection using ground fault detector 72 is as described above, the detailed description thereof will not be repeated.

In S212, ECU 100 determines whether a ground fault has occurred or not on the vehicle 2 side. Based on the signal received from ground fault detector 72 (a signal showing peak value Vp), ECU 100 determines that a ground fault has occurred on the vehicle 2 side. When it is determined that a ground fault has occurred on the vehicle 2 side (YES in S212), the process is advanced to S214.

Figure 6:
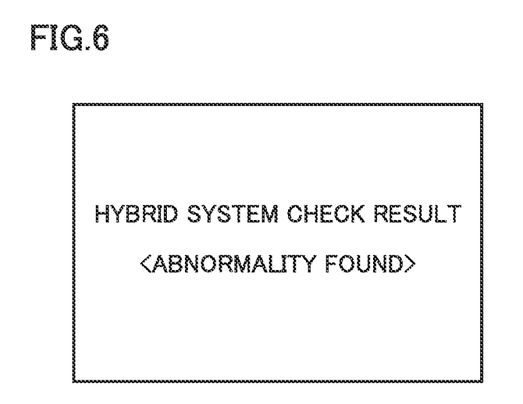
FIG. 6 is a diagram showing an example of a display screen at the time when a ground fault is detected in the vehicle.

In S214, ECU 100 performs a display process (1). The display process (1) is performed, for example, for causing display device 80 to show the information indicating that an abnormality occurs in vehicle 2. For example, as shown in FIG. 6, ECU 100 causes display device 80 to show text information stating: "Hybrid System Check Result <Abnormality Found>". When ECU 100 determines that a ground fault has occurred on the vehicle 2 side, it may cause display device 80 to show the text information shown in FIG. 6, and after that, to show the information that urges stopping of vehicle 2. The text information shown in FIG. 6 is merely by way of example, and not particularly limited to the contents shown in FIG. 6.

When it is determined in S212 that a ground fault has not occurred on the vehicle 2 side (NO in S212), the process is advanced to S216.

In S216, ECU 100 determines whether a prescribed detection time period has elapsed or not since the ground fault detection process was started. The prescribed detection time period is a predetermined time period longer than the time period in which it can be reliably determined whether a ground fault has occurred or not on the vehicle 2 side since the ground fault detection process was started. When it is determined that the prescribed detection time period has elapsed since the ground fault detection process was started (YES in S216), the process is advanced to S218.

Figure 7:
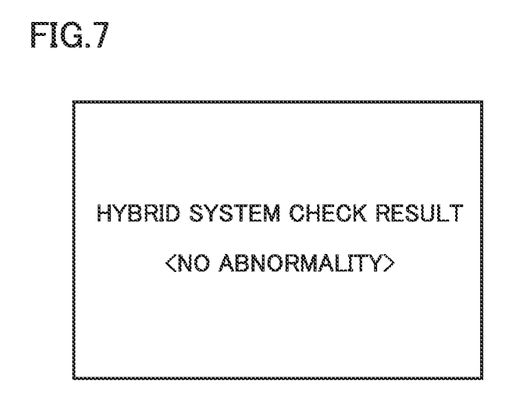
FIG. 7 is a diagram showing an example of the display screen at the time when a ground fault is not detected in the vehicle.

In S218, ECU 100 performs a display process (2). The display process (2) is performed, for example, for causing display device 80 to show the information indicating that an abnormality does not occur in vehicle 2. Thus, the display process (2) is to give a notification about the information different from that shown in the display process (1). For example, as shown in FIG. 7, ECU 100 causes display device 80 to show the text information on the display screen stating: "Hybrid System Check Result <No Abnormality>". The text information shown in FIG. 7 is merely by way of example, and may be information different from that shown in FIG. 6, but is not particularly limited to the contents shown in FIG. 7.

Also in the flowchart in FIG. 5, when external charging is not being conducted (NO in S200), and when abnormality information is not received (NO in S202), the process is returned to S200. For example, when it is determined that external charging of battery 70 has normally been completed in the main routine (not shown), ECU 100 ends the control process shown in the flowchart of FIG. 5 by the interrupting process.

Also, when charging connector 310 is not disconnected in S206 (NO in S206), ECU 100 returns the process to S206. Furthermore, when it is determined in S208 that vehicle 2 is not in a Ready-On state (NO in S208), ECU 100 returns the process to S208. Also, when it is determined in S216 that a prescribed detection time period has not elapsed since the ground fault detection process was started (NO in S216), ECU 100 returns the process to S212.

The operation of charging system 1 according to the present embodiment based on the above-described structures and flowcharts will be hereinafter described with reference to FIG. 8.

Figure 8:
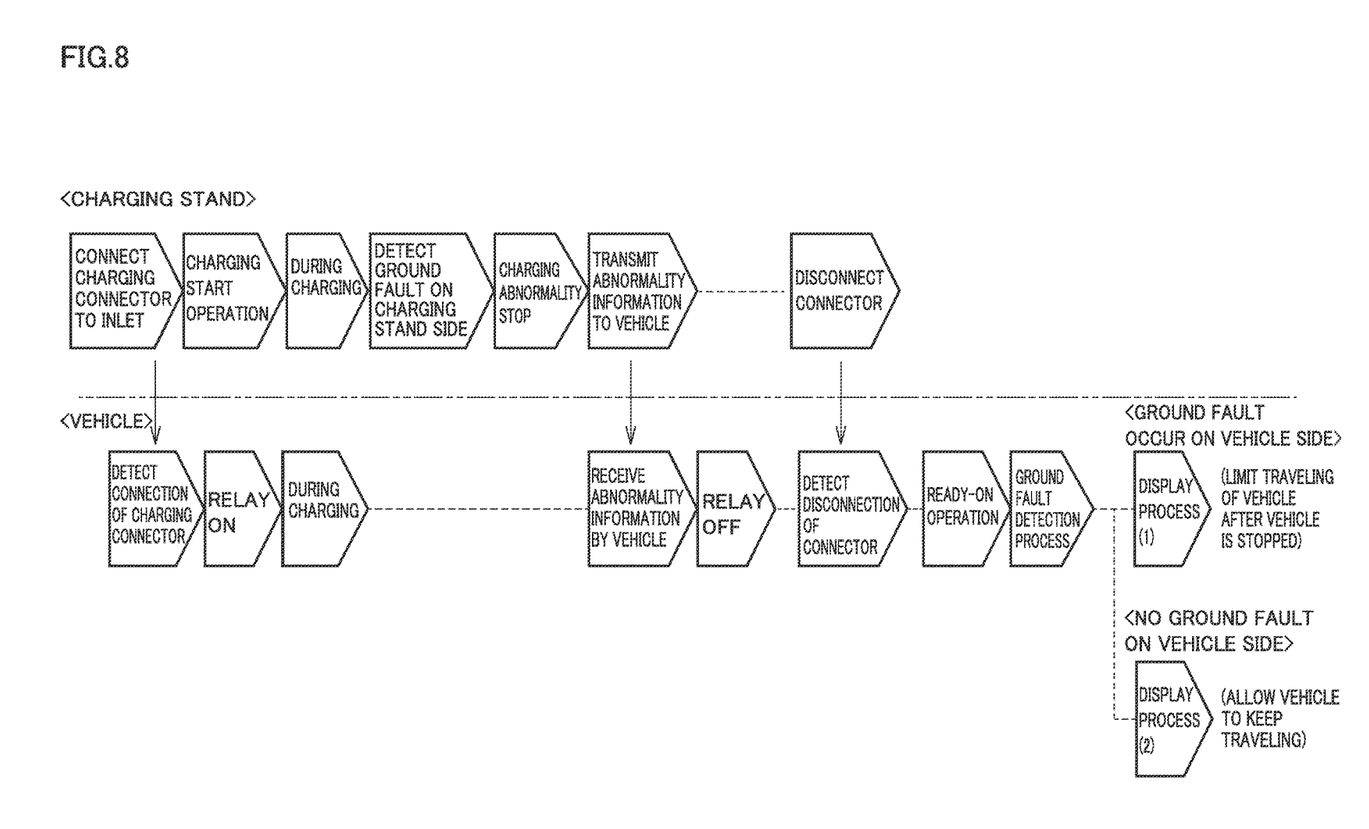
FIG. 8 is a diagram for illustrating an operation of the controller in the charging stand and an operation of the ECU in the vehicle.

FIG. 8 is a diagram for illustrating the operation of controller 202 in charging stand 200 and the operation of ECU 100 in vehicle 2.

As shown in FIG. 8, when the user connects charging connector 310 of charging stand 200 to inlet 94 of vehicle 2, ECU 100 of vehicle 2 detects that charging connector 310 has been connected to inlet 94. When ECU 100 detects that charging connector 310 has been connected to inlet 94, it brings each of SMR 90 and CHR 92 into an ON state, and then stands by.

When the user operates the charge starting switch of charging stand 200, charging is started. In charging stand 200, during charging (YES in S100), the ground fault detection process is performed (S102). On the other hand, in vehicle 2, during external charging (YES in S200), it is determined whether the abnormality information has been received or not (S202).

In charging stand 200, when occurrence of a ground fault has been detected (YES in S104), charging is stopped (S106), and the abnormality information is transmitted from controller 202 to ECU 100 (S108).

In vehicle 2, when the abnormality information is received (YES in S202), SMR 90 and CHR 92 are brought into an OFF state (S204), and it is determined whether charging connector 310 has been disconnected from inlet 94 or not (S206).

The following is a description about the case where the user removes charging connector 310 from inlet 94 without noticing abnormal end of charging, and then the user gets in vehicle 2. In this case, since it is detected that charging connector 310 has been disconnected (YES in S206), it is determined whether vehicle 2 is in a Ready-On state or not (S208).

When vehicle 2 is brought into a Ready-On state (YES in S208) by the user operating start switch 82 after the user gets in vehicle 2, ground fault detection using ground fault detector 72 is started (S210). Then, it is determined whether a ground fault has occurred or not on the vehicle side (S212).

When it is determined that a ground fault has occurred on the vehicle 2 side (YES in S212) by the time when a prescribed detection time period has elapsed (NO in S216), the display process (1) is performed (S214). Thereby, the text information shown in FIG. 6 is to be displayed on the display screen of display device 80.

When occurrence of a ground fault has been detected in vehicle 2, vehicle 2 is stopped and the Ready-Off operation is performed, and after that, the Ready-On operation is not allowed to be accepted, for example. In this way, it is desirable to suppress traveling of vehicle 2.

On the other hand, when a prescribed detection time period has elapsed (YES in S216) without detection of a ground fault (NO in S212), the display process (2) is performed (S218). Thereby, the text information shown in FIG. 7 is to be displayed on the display screen of display device 80. Also, since a ground fault is not detected, vehicle 2 can still be used.

As described above, according to the charging system in the present embodiment, when ECU 100 of vehicle 2 receives the abnormality information from controller 202 of charging stand 200, ECU 100 performs ground fault detection using ground fault detector 72 after charging connector 310 is disconnected. Thus, it can be distinguished whether the ground fault occurring during charging using charging stand 200 occurs in vehicle 2 or not. Therefore, it becomes possible to provide a charging system and an electrically powered vehicle, by which it is distinguished whether a vehicle can be used or not when a ground fault occurs during charging of the power storage device mounted in the vehicle using a charging facility external to the vehicle.

Furthermore, the convenience of vehicle 2 can be improved by determined whether vehicle 2 can be used or not. For example, even when a ground fault is detected during charging using charging stand 200, but when this detected ground fault does not occur in vehicle 2, the user can use vehicle 2 without limitation.

Furthermore, when a ground fault occurs on the vehicle 2 side, for example, it is displayed that an abnormality has occurred in a hybrid system, thereby giving a notification about the information that varies depending on whether a ground fault has been detected or not in vehicle 2. Thus, the user can be notified about appropriate information depending on whether the ground fault occurs or not in vehicle 2.

In the following, modifications will be described.

In the above embodiments, the display process (1) and the display process (2) each have been described as a process in which predetermined text information is displayed on display device 80. However, in place of such text information, image information such as illustrations, icons or warning lights may be displayed on display device 80. For example, in the display process (1), the image information urging re-connection of charging connector 310 may be displayed. In the display process (2), the image information urging stopping of vehicle 2 may be displayed.

In the above embodiments, the display process (1) and the display process (2) each have been described as a process in which the user is notified about the information by displaying information on display device 80. However, the user may be notified about the information, for example, by a voice and a warning sound in a prescribed pattern issued through a speaker and the like in place of using display device 80.

Furthermore, in the above embodiments, charging stand 200 has been described as being configured to convert the AC power of power supply 208 into DC power using power converter 204, and supply the converted DC power to vehicle 2. However, charging stand 200 may be configured to supply the AC power of power supply 208 to vehicle 2. In this case, the power converter for converting AC power into DC power is provided on the vehicle 2 side, and this power converter converts the AC power supplied from charging stand 200 into DC power, thereby charging battery 70.

Furthermore, according to the description in the above embodiments, the ground fault detection method by ground fault detection circuit 206 in charging stand 200 and the ground fault detection method by ground fault detector 72 in vehicle 2 are different. However, the ground fault detection method on the charging stand 200 side may be the same as the ground fault detection method on the vehicle 2 side, or the ground fault detection method on the vehicle 2 side may be the same as the ground fault detection method on the charging stand 200 side.

Furthermore, according to the description in the above embodiments, after the abnormality information is received and charging connector 310 is disconnected, vehicle 2 is brought into a Ready-On state, and then, the display process (1) is performed. However, for example, the display process (1) may be performed when start switch 82 is operated.

Furthermore, according to the description in the above embodiments, controller 202 of charging stand 200 starts charging when the user operates the charge starting switch in charging stand 200. However, for example, controller 202 may measure the time using a timer and start charging at the time when the measured time becomes equal to the prescribed charging start time.

The above-described modifications may be performed while being wholly or partially combined as appropriate.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A charging system comprising:
   an electrically powered vehicle provided with a power storage device configured to supply electric power to a driving motor; and
   a charging facility provided external to the electrically powered vehicle and configured to charge the power storage device,
   the charging facility including
      a power supply,
      a charging connector that is connectable to the electrically powered vehicle,
      a charger configured to charge the power storage device using electric power of the power supply when the charging connector is connected to the electrically powered vehicle, and
      a first detector for detecting, during charging of the power storage device, a ground fault in a charging path extending from the power supply to the power storage device,
   the charging facility being configured to, when the ground fault is detected by the first detector during charging, stop charging of the power storage device and transmit abnormality information indicating occurrence of the ground fault to the electrically powered vehicle,
   the charging path including
      (i) a first path for connecting the power supply and the charging connector, and
      (ii) a second path for connecting the first path and the power storage device when the charging connector is connected to the electrically powered vehicle, and
   the electrically powered vehicle including
      a second detector for detecting a ground fault in the second path, and
      a second controller configured to, when the abnormality information is received from the charging facility, perform ground fault detection using the second detector after the charging connector is disconnected.

2. The charging system according to claim 1, wherein the electrically powered vehicle further includes a notifier for notifying a user of information, and
   the notifier is configured to, when the abnormality information is received, notify a user of information that varies depending on whether or not the ground fault in the second path is detected.

3. The charging system according to claim 1, wherein the ground fault detection is performed after the charging connector is disconnected from an inlet of the electrically powered vehicle.

4. An electrically powered vehicle comprising:
   a driving motor for driving the electrically powered vehicle;
   a power storage device configured to supply electric power to the driving motor;
   a detector for detecting a ground fault in the electrically powered vehicle; and
   a controller configured to perform ground fault detection using the detector, when abnormality information indicating a ground fault is received from a charging facility during charging of the power storage device using the charging facility, the ground fault detection being performed after the electrically powered vehicle and the charging facility are disconnected from each other, the charging facility being provided external to the electrically powered vehicle.

5. The electrically powered vehicle according to claim 4, further comprising a notifier for notifying a user of information, wherein
   the notifier is configured to, when the abnormality information is received, notify a user of information that varies depending on whether or not the ground fault in the electrically powered vehicle is detected.

6. The electrically powered vehicle according to claim 4, wherein the ground fault detection is performed after the charging facility is disconnected from an inlet of the electrically powered vehicle.

* * * * *

UNITED STATES PATENT AND TRADEMARK OFFICE
CERTIFICATE OF CORRECTION

PATENT NO. : 10,471,830 B2
APPLICATION NO. : 15/686841
DATED : November 12, 2019
INVENTOR(S) : Koichi Kojima Page 1 of 1

It is certified that error appears in the above-identified patent and that said Letters Patent is hereby corrected as shown below:

On the Title Page

Column 2, item (74), Attorney, Agent or Firm, delete "Disnmore & Shohl LLP" and insert --Dinsmore & Shohl LLP--, therefor.

Signed and Sealed this
Fourteenth Day of January, 2020

Andrei Iancu
*Director of the United States Patent and Trademark Office*